United States Patent
Tian et al.

(10) Patent No.: US 11,788,992 B2
(45) Date of Patent: *Oct. 17, 2023

(54) MICROTEXTURE REGION CHARACTERIZATION SYSTEMS AND METHODS

(71) Applicant: RAYTHEON TECHNOLOGIES CORPORATION, Farmington, CT (US)

(72) Inventors: Yong Tian, Avon, CT (US); Ronald Roberts, Ames, IA (US)

(73) Assignees: RTX Corporation, Farmington, CT (US); Iowa State University Research Foundation, Inc, Ames, IA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/744,082

(22) Filed: May 13, 2022

(65) Prior Publication Data
US 2022/0276205 A1 Sep. 1, 2022

Related U.S. Application Data

(63) Continuation of application No. 16/792,218, filed on Feb. 15, 2020, now Pat. No. 11,333,633.

(51) Int. Cl.
*G01N 29/44* (2006.01)
*G01N 29/07* (2006.01)
(Continued)

(52) U.S. Cl.
CPC ....... *G01N 29/4445* (2013.01); *G01N 29/043* (2013.01); *G01N 29/07* (2013.01);
(Continued)

(58) Field of Classification Search
CPC .. G01N 29/4445; G01N 29/043; G01N 29/07; G01N 29/4427; G01N 29/50;
(Continued)

(56) References Cited

U.S. PATENT DOCUMENTS

| | | | | |
|---|---|---|---|---|
| 4,899,589 A | * | 2/1990 | Thompson | G01N 29/07 73/602 |
| 5,277,718 A | * | 1/1994 | Paxson | C22F 1/183 148/670 |

(Continued)

FOREIGN PATENT DOCUMENTS

EP 1850126 10/2007

OTHER PUBLICATIONS

Correlating Ultrasonic Attenuation and Microtexture in a Near-Alpha Titanium Alloy, Bhattacharjee et al., The Minerals, Metals & Materials Society and ASM International. (Year: 2011).*

(Continued)

*Primary Examiner* — Jacques M Saint Surin
(74) *Attorney, Agent, or Firm* — Snell & Wilmer L.L.P.

(57) ABSTRACT

The present disclosure provides methods and systems for the characterization of a microtexture of a sample, component, or the like. The methods may include methods of determining a service life limiting region of a component, determining a treatment method for a component, and/or selecting components from a batch of components for use in production. The characterization may include calculating a microtexture level indicator from ultrasonic C-scan images for various samples, regions, components, or the like. The microtexture level indicator may include at least one of an average peak factor, a standard deviation of peak amplitude, and/or a baseband bandwidth.

18 Claims, 9 Drawing Sheets

Related U.S. Application Data

(60) Provisional application No. 62/897,887, filed on Sep. 9, 2019.

(51) Int. Cl.
  *G01N 29/04* (2006.01)
  *G01N 29/50* (2006.01)

(52) U.S. Cl.
  CPC ......... *G01N 29/4427* (2013.01); *G01N 29/50* (2013.01); *G01N 2291/0234* (2013.01); *G01N 2291/0289* (2013.01)

(58) Field of Classification Search
  CPC ......... G01N 2291/265; G01N 29/0645; G01N 29/262; G01N 29/28; G01N 29/4409; G01N 29/4454; G01N 29/4472; G01N 29/11; G01N 2291/2693; G01N 2291/10234; G01N 2291/0422; G01N 2291/101; G01N 2291/106; G01N 2291/0289
  USPC .............................................. 73/597
  See application file for complete search history.

(56) References Cited

U.S. PATENT DOCUMENTS

| | | | |
|---|---|---|---|
| 6,387,197 | B1 | 5/2002 | Bewlay et al. |
| 9,070,203 | B2 * | 6/2015 | Salem ................... G06T 7/11 |
| 9,945,816 | B2 | 4/2018 | Turner et al. |
| 10,161,917 | B2 | 12/2018 | Coulette et al. |
| 11,333,633 | B2 * | 5/2022 | Tian ................... G01N 29/28 |
| 11,467,133 | B2 * | 10/2022 | Tian ................... G01N 29/262 |
| 2002/0189359 | A1 | 12/2002 | Batzinger et al. |
| 2004/0074308 | A1 | 4/2004 | Boecker et al. |
| 2005/0241397 | A1 | 11/2005 | Bergman |
| 2009/0116697 | A1 | 5/2009 | Shalaby et al. |
| 2013/0208951 | A1 | 8/2013 | Salem et al. |
| 2013/0253858 | A1 | 9/2013 | Glavicic et al. |
| 2018/0113097 | A1 | 4/2018 | Bueno et al. |
| 2019/0086343 | A1 | 3/2019 | Cernatescu et al. |
| 2019/0369421 | A1 | 12/2019 | Satko et al. |
| 2021/0072197 | A1 | 3/2021 | Tian et al. |
| 2023/0003694 | A1 * | 1/2023 | Tian ................... G01N 29/4472 |

OTHER PUBLICATIONS

European Patent Office, European Search Report dated May 31, 2021 in Application No. 21492001.9.

Blackshire et al., "Coherent ultrasonic backscatter within a textured titanium alloy", AIP Conference Proceedings, vol. 2102, Jan. 1, 2019, p. 020021, XP055805471, New York, US, ISSN: 0094-243X, DOI: 10.1063/1.5099725.

Milne et al., "Ultrasonic Non-destructive Evaluation of Titanium Diffusion Bonds", Journal of Nondestructive Evaluation, Kluwer Academic Publishers-Plenum Publishers, NE, vol. 30, No. 4, Jul. 28, 2011, pp. 225-236, XP019973087, ISSN: 1573-4862, DOI: 10.1007/S10921-011-0111-Y.

Bhattacharjee et al., "Correlating Ultrasonic Attenuation and Microtexture n a Near-Alpha Titanium Alloy", Metallurgical and Materials Transactions A, Springer-Verlag, New York, vol. 42, No. 8, Feb. 12, 2011, pp. 2358-2372, XP035069768, ISSN: 1543-1940, DOI: 10.1007/S11661-011-0619-X.

USPTO, Non-Final Office Action dated Sep. 14, 2021 in U.S. Appl. No. 16/792,218.

USPTO, Notice of Allowance dated Jan. 20, 2022, in U.S. Appl. No. 16/792,218.

Jia Li, The Ohio State University, "Ultrasonic Characterization of Polycrystals with Texture and Microtexture: Theory and Experiment", pp. 1-420, 2015.

Adam L. Pilchak, et al., "A Quantitative Assessment of Microtexture in Titanium Alloys using Destructive and Nondestructive Methods", pp. 1448-1449, Microsc. Microanal. 20 (Suppl 3), 2014, Microscopy Society of America 2014.

European Patent Office, European Office Action dated Mar. 29, 2023 in Application No. 21492001.9.

Humber et al., "Analysis of backscattered ultrasound amplitude of Ti—5.8Al—4Sn—3.5Zr—0.7Nb—0.5Mo—0.3Si samples in terms of their microstructures and local textures", Acta Materialia, Elsevier, Oxford, GB, vol. 57, No. 3, Feb. 1, 2009, pp. 708-714, XP025860271, ISSN: 1359-6454.

* cited by examiner

MICROTEXTURE REGION CHARACTERIZATION SYSTEMS AND METHODS

CROSS-REFERENCE TO RELATED APPLICATIONS

This application is a continuation of, claims priority to U.S. application Ser. No. 16/792,218 filed on Feb. 15, 2020, entitled "MICROTEXTURE REGION CHARACTERIZATION SYSTEMS AND METHODS" (hereinafter the '218 application). The '218 application is a Non-Provisional application, claims priority to, and the benefit of U.S. Provisional Application No. 62/897,887, filed on Sep. 9, 2019, entitled "TEXTURE CHARACTERIZATION," (hereinafter the '887 application). The '218 application and the '887 application are hereby incorporated by reference in their entirety for all purposes.

FIELD

The present disclosure relates to the methods and systems for characterizing microtexture regions (MTR's) of components

BACKGROUND

MTR's exist in titanium alloys, nickel alloys, or the like. A MTR may contain hexagonal α-phase crystallites aligned, mostly, in the same or close crystallographic orientation in a region far greater than a typical α grain size. Microstructure is a fine structure of material. The presence of MTR's may reduce service life of various components. For example, the existence of MTR was linked to dwell fatigue susceptibility, which may cause early failure in titanium-based aero-engine components. Typical methods for MTR characterization are destructive to the component.

SUMMARY

A method is disclosed herein. The method may comprise: scanning a plurality of regions of a component with an ultrasonic transducer; calculating a microtexture level indicator for each region in the plurality of regions; and characterizing a limiting region in the plurality of regions, the limiting region corresponding to a maximum microtexture level indicator.

In various embodiments, the microtexture level indicator may comprise at least one of an average peak factor, a standard deviation of peak amplitudes, and a baseband bandwidth (in spatial frequency spectrum). The scanning may be performed in a tank filled with a fluid, and the component may be disposed in the tank. The microtexture level indicator may include a peak factor, the peak factor be calculated based on a peak factor equation $$\text{The Peak Factor} = \frac{\text{Peak Amplitude} - \text{Mean Amplitude}}{\text{Mean Amplitude.}}.$$

The peak factor of each region in the plurality of regions may correspond to an average peak factor over a range of peak factors from the scanning. The method may further comprise comparing the microtexture level indicator of the plurality of regions. The limiting region may be a service life limiting region of the component.

A method is disclosed herein. The method may comprise: scanning a plurality of samples with an ultrasonic transducer, each sample in the plurality of samples being different; calculating a microtexture level indicator for each sample in the plurality of samples; characterizing a microtexture level of each sample in the plurality of samples based on the microtexture level indicator.

In various embodiments, each sample in the plurality of samples may correspond to a different heat treatment process of an alloy. The method may further comprise selecting a heat treatment process for an alloy corresponding to a lowest microtexture level in the plurality of samples. The microtexture level indicator may comprise at least one of an average peak factor, a standard deviation of peak amplitudes, and a baseband bandwidth. The method may further comprise comparing the microtexture level indicator for each sample in the plurality of samples. The scanning may be performed in a tank filled with a fluid, and wherein the sample is disposed in the tank. The microtexture level indicator may include a peak factor, the peak factor be calculated based on a peak factor equation $$\text{The Peak Factor} = \frac{\text{Peak Amplitude} - \text{Mean Amplitude}}{\text{Mean Amplitude.}}.$$

A method is disclosed herein. The method may comprise: scanning a batch of components with an ultrasonic transducer; calculating a microtexture level indicator for each component in the batch of components; and scrapping a portion of the batch of components in response to the microtexture level indicator of each component in the portion of the batch of components exceeding a predetermined microtexture level indicator threshold.

In various embodiments, the method may further comprise scanning a plurality of regions of a component in the batch of components with the ultrasonic transducer prior to scanning a remaining portion of the batch of components; and characterizing a limiting region in the plurality of regions, the limiting region corresponding to a maximum microtexture level indicator. The microtexture level indicator for each component may be determined from the limiting region in the plurality of regions. The microtexture level indicator may comprise at least one of an average peak factor, a standard deviation of peak amplitude, and a baseband bandwidth. The method may further comprise comparing the microtexture level indicator for each component in the batch of components. The scanning may be performed in a tank filled with a fluid, and the component may be disposed in the tank.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

Figure 1:
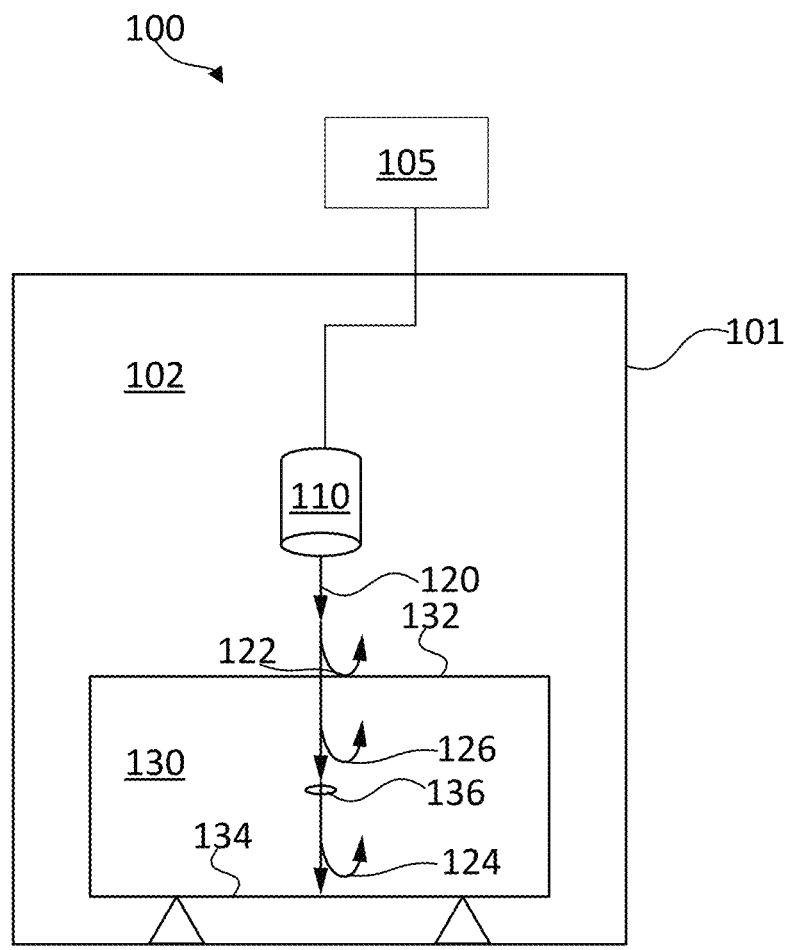
FIG. 1 illustrates a system of MTR characterization, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with gas turbine engines. However, various aspects of the disclosed embodiments may be adapted for optimized performance in a variety of engines or other applications. As such, numerous applications of the present disclosure may be realized.

Ultrasonic waves propagating in polycrystals create backscattered noise due to variations of physical properties in microstructures. The strength of backscattered noise is related to wavelength, beam properties, and microstructure properties, etc. In case of titanium forgings, typical grain sizes are around 10 microns, while MTR sizes are in order of a few hundreds to a few thousands microns. For an ultrasonic transducer with a center frequency of 15 MHz, its wavelength is about 400 μm in a longitudinal mode, and is about 200 μm in a transverse wave mode, respectively. As these wavelengths are far greater the grain sizes but in comparable with MTR sizes, it is expected that MTR's are far more significant contributors to backscattered noise than typical grains under this working frequency. The selection of ultrasonic working frequency is dependent on MTR sizes of interest, geometry, material properties, and so on. The strength of backscattered noise is also significantly influenced by the angle between the orientation of a microstructural feature and the propagating direction of ultrasonic waves. For instance, an ellipsoidal scatterer generates least amount of backscattered noise when its elongation direction is parallel with the wave propagation direction. In contrast, a same sized ellipsoidal scatterer could generate far greater amount of backscattered noise when its elongation direction is normal to the wave propagation direction. Consequently, it is ideal to choose the incidence angle of ultrasonic waves to be normal to the grain flow line direction of the region of interests. For a component of complex geometry, it is often wise to segment the region of interests based on its primary grain flow line orientation and select the corresponding incident angles and gating parameters for each individual region. Generally, efforts shall be made to control relevant factors in the inspection process to increase comparability among regions of interests. It is expected that sensitivity of MTR evaluation increases when more relevant factors are controlled. For example, more sensitive comparisons may be achieved among areas with same or close geometric features, sam flow line orientations and inspected with same inspection parameters.

In a typical amplitude C-scan image, a peak amplitude is recorded at each scanning position, whereas the peak amplitude corresponding to the maximum (peak) value of backscattered noise within a pre-defined (time) gate recorded at the associated scanning position. As a whole, a C-scan image is a two-dimensional matrix of peak amplitudes of backscattered noises. Consequently, a number of statistical indicators can be derived from a C-scan image, either treated as a one-dimensional sequence, or a two-dimensional matrix. Some statistical estimators may be derived from the corresponding spatial frequency spectrum, which is a two-dimensional Fourier transform of the original image.

Referring now to FIG. 1, in accordance with various embodiments, a system 100 of MTR characterization of a component 130 is illustrated, in accordance with various embodiments. The system comprises a tank 101, a component 130, a transducer 110, and a controller 105. The component 130 may comprise a metal, metal alloy, or any other suitable material. The component 130 may be a stainless steel alloy, a nickel alloy, a titanium alloy, an aluminum alloy, or the like. In various embodiments, the tank 101 may be filled with a fluid 102, such as water or the like. The component 130 is disposed in the tank 101. The component 130 may be disposed on supports disposed between the component 130 and a surface of the tank 101. The transducer 110 may be a single-element immersion ultrasonic transducer or a phased array transducer containing a number of elements. The transducer 110 may also be disposed in the tank 101 and electrically coupled to the controller 105.

The system 100 includes the controller 105 in electronic communication with the transducer 110. In various embodiments, controller 105 may contain a pulser/receiver, which can drive the transducer 110 to transmit and receive ultrasonic pulses. In various embodiments, controller 105 may also contain a high-speed analog-to-digital converter, which can convert received analog ultrasonic signals into digital signals for recording and processing. In various embodiments, controller 105 may contain a motion control module, which can position the transducer 110 at a desired scanning position and perform automated inspection of a component 130 following a pre-defined scanning surface. In various embodiments, controller 105 may contain a software tool to perform various signal/image acquisition, filtering, display and storage functionalities. In various embodiments, controller 105 may contain a software interface, which enables user adjustment of inspection parameters of all relevant subsystems mentioned previously. In various embodiments, controller 105 may contain a PC to host all software tools as well as hardware components. In various embodiments, controller 105 may be configured as a central network element or hub to access various systems and components of system 100. Controller 105 may comprise a network, computer-based system, and/or software components configured to provide an access point to various systems and components of system 100.

In various embodiments, controller 105 may comprise a processor. In various embodiments, controller 105 may be implemented in a single processor. In various embodiments, controller 105 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 105 may comprise a processor configured to implement various logical operations in response to execution of instructions, for example, instructions stored on a non-transitory, tangible, computer-readable medium configured to communicate with controller 105.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, controller 105 may be in electronic communication with the transducer 110. The transducer 110 may comprise an ultrasonic single-element transducer, a phased array transducer or the like. For example, the transducer 110 may be configured to convert a broad band excitation signal into an ultrasonic wave. The transducer 110 may be configured to produce an ultrasonic wave 120 into within the tank 101 filled with the fluid 102 and receive a return signal of the ultrasonic wave 120. The ultrasonic wave 120 may propagate within the component 130. For example, a first return signal 122 may be produced on a front surface 132 of the component 130. Similarly, a second return signal 124 may be produced on a back surface 134 of the component 130. If there is a defect 136 in the component, a third return signal 126 may be produced from the defect 136 of the component 130.

In various embodiments, the controller 105 may be programmed to control the position and excitation parameters of transducer 110. Although shown as controlling the transducer 110, in various embodiments, a controller 105 may be coupled a robot/servomotor that is coupled to the component 130 and programmed to control the position of the component 130 while the transducer 110 remains stationary. In various embodiments, the transducer 110 may be moved automatically during operation.

Figures 2A, 2B:
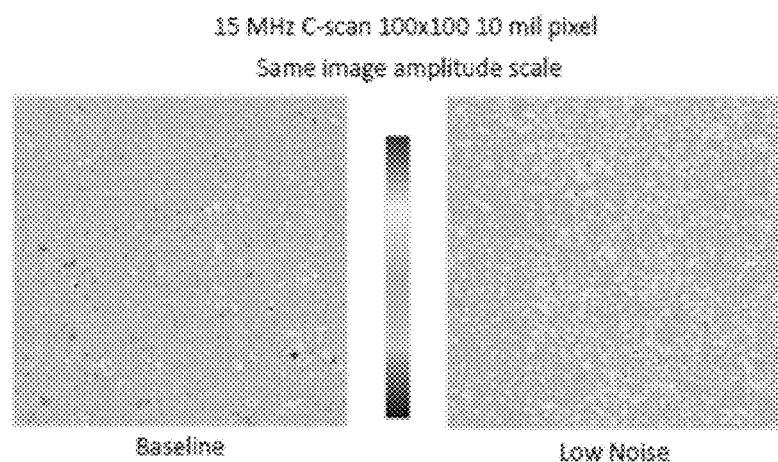
FIG. 2A illustrates a C-scan of a baseline sample, in accordance with various embodiments.
FIG. 2B illustrates a C-scan of a low noise sample, in accordance with various embodiments.

In various embodiments, the transducer 110 is configured to receive ultrasonic backscattered noise associated with the microstructure variations within the component 130. "Backscattered noise," as disclosed herein, contains ultrasonic waves 120 reflected by microstructures in component 130 and received by the transducer 110. The controller 105 may record the backscattered noise collected at each X-Y coordinates on a scanning surface of a sample of the component 130. For example, with brief reference to FIGS. 2A and 2B, a C-Scan of a baseline sample (FIG. 2A) and a low noise sample (FIG. 2B) of a component 130 is illustrated. The baseline sample and the low noise sample are same component fabricated with different heat treatment processes, respectively. Consequently, the low noise sample has smaller MTR sizes as compared to that of the baseline sample. A "C-Scan," as referred to herein, is data collected from an ultrasonic inspection that is plotted on a top view of the component surface under test. A C-scan image allows pseudo color to represent the peak amplitudes within a time or depth gate as a function of transducer position. The two-dimensional images can be generated on flat, or curved, parts by tracking data to an X-Y position on a scanning surface. In various embodiments, the peak amplitude of the baseline sample (FIG. 2A) and the low noise sample (FIG. 2B) are recorded. As shown, the backscattered noise of the low noise sample (FIG. 2B) has a relatively tight amplitude distribution over the sample (i.e., the amplitude of backscattered noise has a smaller standard deviation), in comparison with backscattered noise of the baseline sample (FIG. 2A). This backscattered noise may be quantified and used to characterize MTR content of a component 130.

From the data collected in the C-Scan, a plot of peak amplitudes for a given sample, or a selected zone within the sample, in descending order from largest to smallest may be established. The peak amplitudes may correspond to backscattered noise from MTRs within the sample, as well as other microstructural features. A peak factor may be defined by the following equation:

$$\text{Peak Factor} = \frac{\text{Peak Amplitude} - \text{Mean Amplitude}}{\text{Mean Amplitude}}$$

Figure 2C:
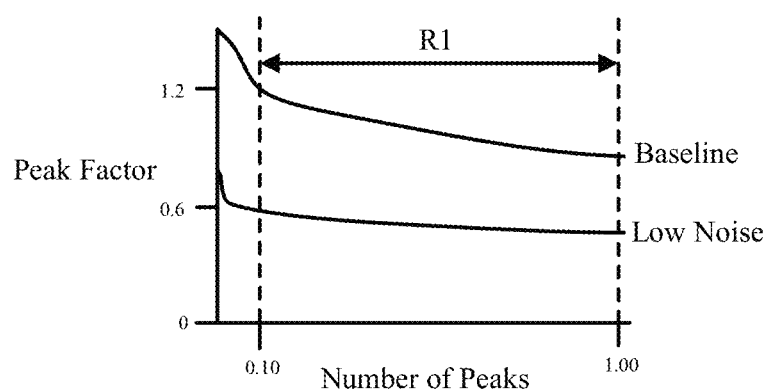
FIG. 2C illustrates a peak factor plot comparing the baseline sample from FIG. 2A to the low noise sample of FIG. 2B.

A mean of the peak factors may be calculated over a pre-determined sample size. For example, a sample size may be 5-100 peak factors, 10-1,000 peak factors, or the like. Alternatively, a mean of the peak factors may be calculated over a qualified pool of samples. For example, all peak amplitudes greater than the sum of the mean peak amplitude plus two times of the standard deviation may be selected. The first 5-10 peak factors may be removed from the sample as potential outliers. Any number of outliers may be removed from the sample and be within the scope of this disclosure. The peak factor for a sample/region may be plotted vs. the sample index. For example, each amplitude in the sample/region may correspond to a respective peak factor. In various embodiments, in plotting the peak factor as a function of the sample index, two samples/regions may be compared to characterize MTR content. A lower peak factor may correspond to lower microtexture levels and/or greater service life of the sample and/or component, in combination with knowledge of other critical factors related to service life. For example, referring now to FIG. 2C, the peak factor vs. the number of peaks is plotted for the baseline sample (FIG. 2A), and the low noise sample (FIG. 2B), respectively. The peak factor of each peak is calculated of range R1, which is normalized. For example, when the range is from the $10^{th}$ largest peak to the $100^{th}$ largest peak, the number of peaks is plotted from 0.10 to 1.00. From the plot shown in FIG. 2C, an average peak factor can be calculated over the range R1. The average peak factor can be utilized to characterize each sample (i.e., baseline sample (FIG. 2A) and low noise sample (FIG. 2B). As shown, the peak factor, and average peak factor, of the low noise sample (FIG. 2A) is lower over the entire range R1 compared to the baseline sample (FIG. 2A). As such, the low noise sample may be characterized as having lower microtexture levels and/or greater service life than the baseline sample (FIG. 2A). In various embodiments, the peak factor may be utilized as an indicator of a microtexture level of a given sample, component, or the like.

Figure 3A:
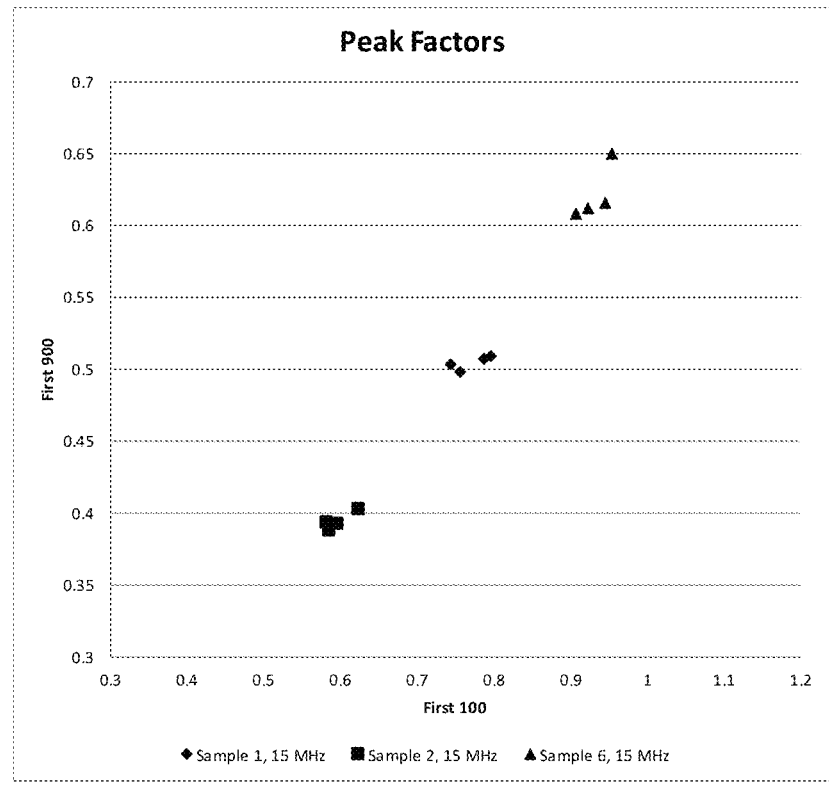
FIG. 3A illustrates an averaged peak factor comparison of various samples, in accordance with various embodiments.

In various embodiments, an indicator of a microtexture level may comprise an average peak factor comparison, a standard deviation of peak amplitudes comparison, and/or a baseband bandwidth comparison. For example, peak factors may be plotted as an average peak factor over a first range (e.g., peaks 10-1,000) vs average peak factor over a second range (e.g., peaks 10-100) (i.e., FIG. 3A). In this regard, a microtexture level of samples may be compared. For example, with reference to FIG. 3A, peak factors of the baseline sample from FIG. 2A, the low noise sample from 2B, and a high noise sample are plotted over a first range (10-1,000) vs. a second range (10-100). The plot may provide visual indications of which samples (i.e., baseline, low noise, or high noise) have lower or higher microtexture levels. In various embodiments, the plot may provide visual indications of which region (i.e., a first region of the baseline compared to a second region of the baseline) has lower or higher microtexture levels. The microtexture levels may be utilized to determine which regions of a component may experience greater service life, which heat treatments provides greater service life for a given component, which components in a batch of components provide greater service life, and/or which components in a batch of components should be scrapped.

Figure 3B:
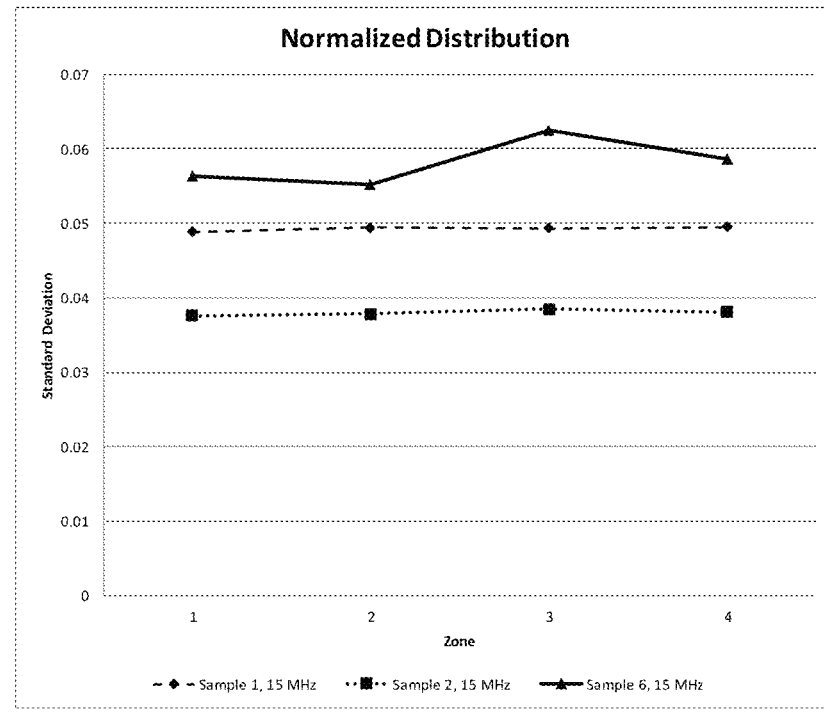
FIG. 3B illustrates a standard deviation comparison of various samples, in accordance with various embodiments.

In various embodiments, an indicator of a microtexture level may comprise a standard deviation of peak amplitudes comparison. Despite efforts made to achieve similar amplitude range in each testing zone, some variations in amplitudes exist due to variations in incident wave strength, geometry, material properties and beam properties. Thus, peak amplitudes acquired from different samples/zones may be scaled to have same mean amplitude first to enable direct comparison with each other. The standard deviation of scaled peak amplitudes may be plotted as a standard deviation of a region (i.e., zone) vs. the region (i.e., zone) of the sample (i.e., FIG. 3B). In this regard, a microtexture level of samples may be compared. For example, with reference to FIG. 3B, standard deviations of the baseline sample from FIG. 2A, the low noise sample from 2B, and a high noise sample are plotted over various zones, or regions, of a sample. The plot may provide visual indications of which samples (i.e., baseline, low noise, or high noise) have lower (e.g., low noise) or higher (e.g., high noise) microtexture levels. In various embodiments, the plot may provide visual indications of which region (i.e., a first region of the baseline compared to a second region of the baseline) has lower or higher microtexture levels. The microtexture levels may be utilized to determine which regions of a component may experience greater service life, which heat treatments provides greater service life for a given component, which components in a batch of components provide greater service life, and/or which components in a batch of components should be scrapped.

Figure 3C:
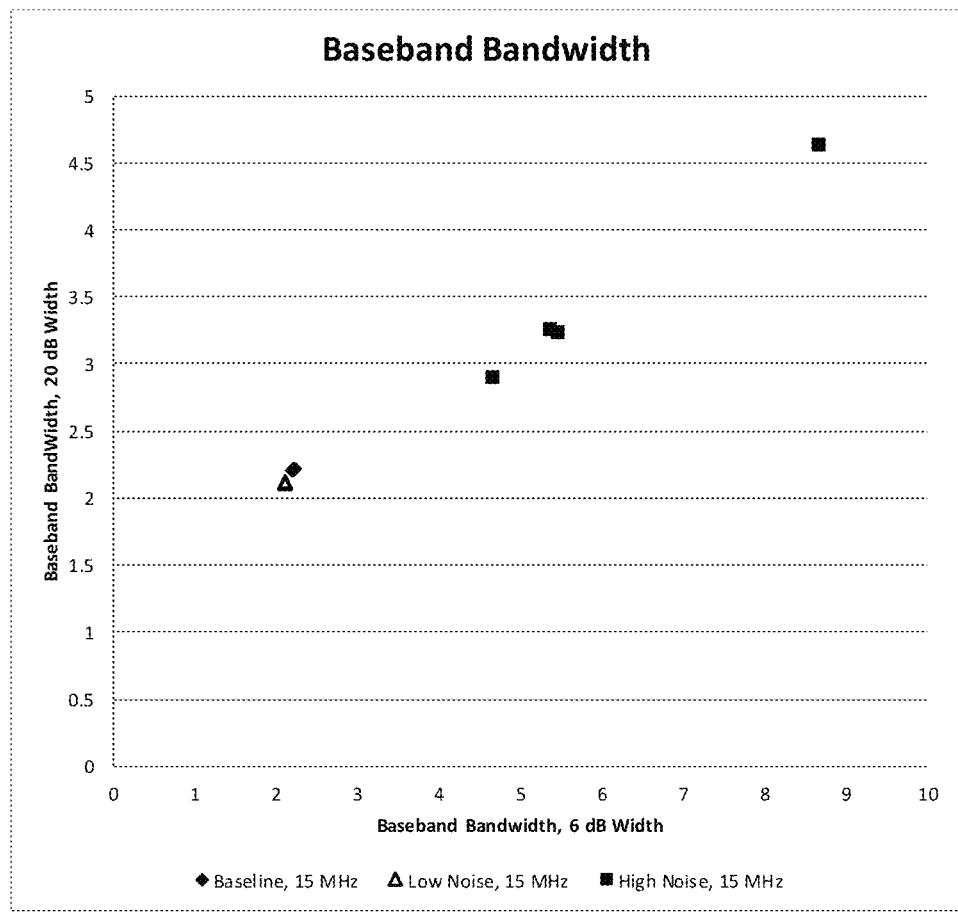
FIG. 3C illustrates a baseband bandwidth comparison of various samples, in accordance with various embodiments.

In various embodiments, an indicator of a microtexture level may comprise a baseband bandwidth comparison. A C-scan amplitude image may be transformed to frequency domain utilizing a two-dimensional Fourier transform. Generally, most power in the frequency domain locates within the baseband, which is the band close to the zero frequency. The bandwidth of the baseband contains useful information of how backscattered noises are distributed spatially. Herein, a bandwidth is not limited to the common definition of a 6 dB width, but may be a 10 dB width, a 20 dB width, or like. Moreover, a bandwidth is defined as the longest width of the baseband, as a two-dimensional baseband may not be axis-symmetric, or its elongation direction may not aligned with either axis of the domain. Consequently, a baseband bandwidth defined with a first width (e.g., 20 dB width) of the sample may be plotted vs. a baseband bandwidth defined with a second width (e.g., 6 dB width) of the sample (i.e., FIG. 3C). In this regard, a microtexture level of samples may be compared. For example, with reference to FIG. 3C, baseband bandwidth in a 6 dB sense of the baseline sample from FIG. 2A, the low noise sample from 2B, and a high noise sample are plotted against baseband bandwidth in a 20 dB sense of the sample. The plot may provide visual indications of which samples (i.e., baseline, low noise, or high noise) have lower (e.g., low noise) or higher (e.g., high noise) microtexture levels. In various embodiments, the plot may provide visual indications of which region (i.e., a first region of the baseline compared to a second region of the baseline) has lower or higher microtexture levels. The microtexture levels may be utilized to determine which regions of a component may experience greater service life, which heat treatments provides greater service life for a given component, which components in a batch of components provide greater service life, and/or which components in a batch of components should be scrapped.

Figure 4:
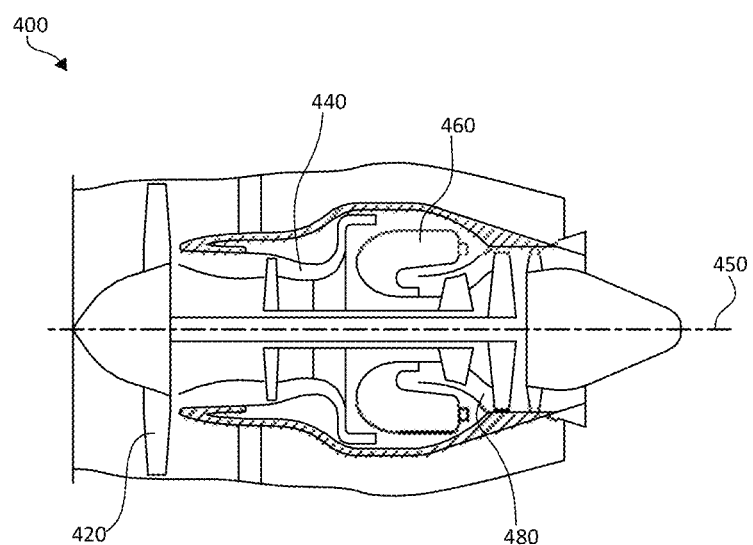
FIG. 4 illustrates a schematic view of a gas turbine engine, in accordance with various embodiments.

In various embodiments, this disclosure may be applied to a gas turbine engine in an aircraft, and specifically, in a fan blade, or other rotor blade, of a gas turbine engine. Referring to FIG. 4, a gas turbine engine 400 is illustrated according to various embodiments. The gas turbine engine 400 may generally comprise, in serial flow communication, a fan 420 through which ambient air is propelled, a compressor section 440 for pressurizing the air, a combustor 460 in which the compressed air is mixed with fuel and ignited for generating an annular stream of hot combustion gases, and a turbine section 480 for extracting energy from the combustion gases. Axis of rotation 450 may define the forward-aft position of the gas turbine engine 400. For example, the fan 420 may be referred to as forward of the turbine section 480 and the turbine section 480 may be referred to as aft of the fan 420. As air flows from the fan 420 to the more aft components of the gas turbine engine 400, the axis of rotation 450 may also generally define the direction of the air stream flow.

Figure 5:
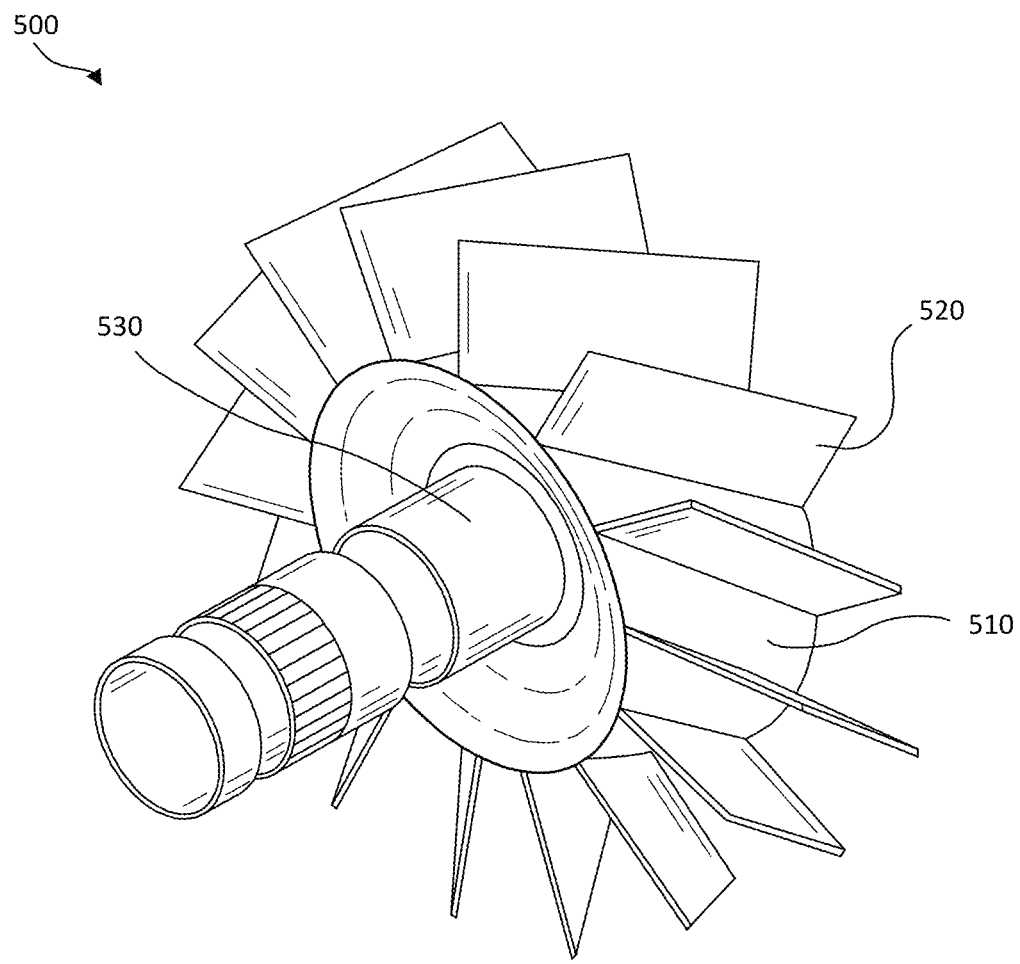
FIG. 5 illustrates perspective view of a rotor, in accordance with various embodiments.

Referring to FIGS. 4 and 5, in accordance with various embodiments, a rotor 500 which may be used in the gas turbine engine 400 of FIG. 4, or in any other adequate type of gas turbine engine, is illustrated. In the illustrated embodiment, the rotor 500 is a first stage of a high pressure compressor of the compressor section 440. However, it is understood that the rotor can be any other rotor of the gas turbine engine 400, including a turbine rotor, a fan rotor, and so on. The rotor 500 may comprise a rotor disk 510 which supports a circumferential array of regularly spaced blades

520. The rotor disk 510 and the blades 520 may be, but are not necessarily, integrally molded (i.e., form a monolithic structure). The rotor disk 510 may include a hub 530 for engaging a central shaft. With combined reference to FIGS. 1 and 5, the system 100 may be utilized to determine which regions of a component (e.g., rotor 500) may experience greater service life, which heat treatments provides greater service life for a given component (e.g., rotor 500), which components in a batch of components (e.g., a batch of rotor 500) provide greater service life, and/or which components in a batch of components (e.g., a batch of rotor 500) should be scrapped. Although described with respect to rotor 500, a microtexture analysis of any component is within the scope of this disclosure.

Figure 6:
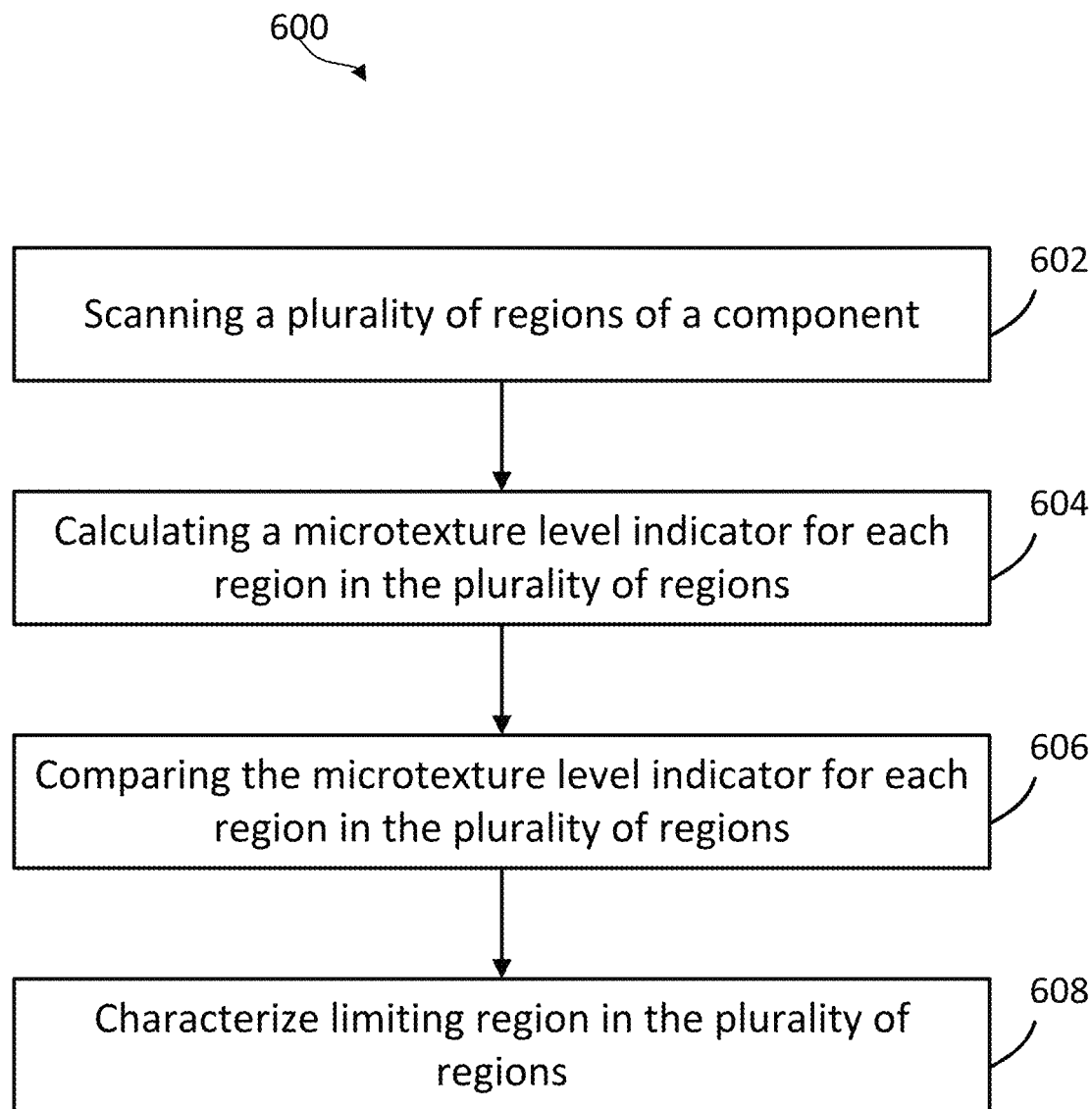
FIG. 6 illustrates a method of characterizing a limiting region of a component, in accordance with various embodiments.

Referring now to FIG. 6, a method 600 of determining a service life limiting region of a component is illustrated in accordance with various embodiments. The method comprises scanning a plurality of regions of a component (step 602). The scanning may be performed in accordance with the system 100 from FIG. 1. The component may comprise a rotor 500, or any other gas-turbine engine component. The scanning may be performed by an ultrasonic transducer, or the like. The method 600 may further comprise calculating a microtexture level indicator for each region in the plurality of regions (step 604). The microtexture level indicator may comprise at least one of an average peak factor, a standard deviation of peak amplitudes, and/or a baseband bandwidth.

The method 600 may further comprise comparing the microtexture level indicator for each region in the plurality of regions of the component (step 606). In this regard, the microtexture level indicator may be plotted providing a visual indication of the microtexture level indicator as a function of region. The method 600 may further comprise characterize limiting region in the plurality of regions of the component (step 608). In this regard, a region in the plurality of regions that includes the highest microtexture level indicator in the plurality of regions may be characterized as a limiting region of the component. The limiting region of the component may correspond to a service life limiting region of the component. A "service life limiting region" as disclosed herein may correspond to a region of a component that is likely to limit the service life of the component based on its microtexture level. By characterizing a component in this manner, a design of a component may be modified to increase a service life of the component. In various embodiments, characterizing refers to assigning a service life limit to the life limiting region of the component, or the like.

Figure 7:
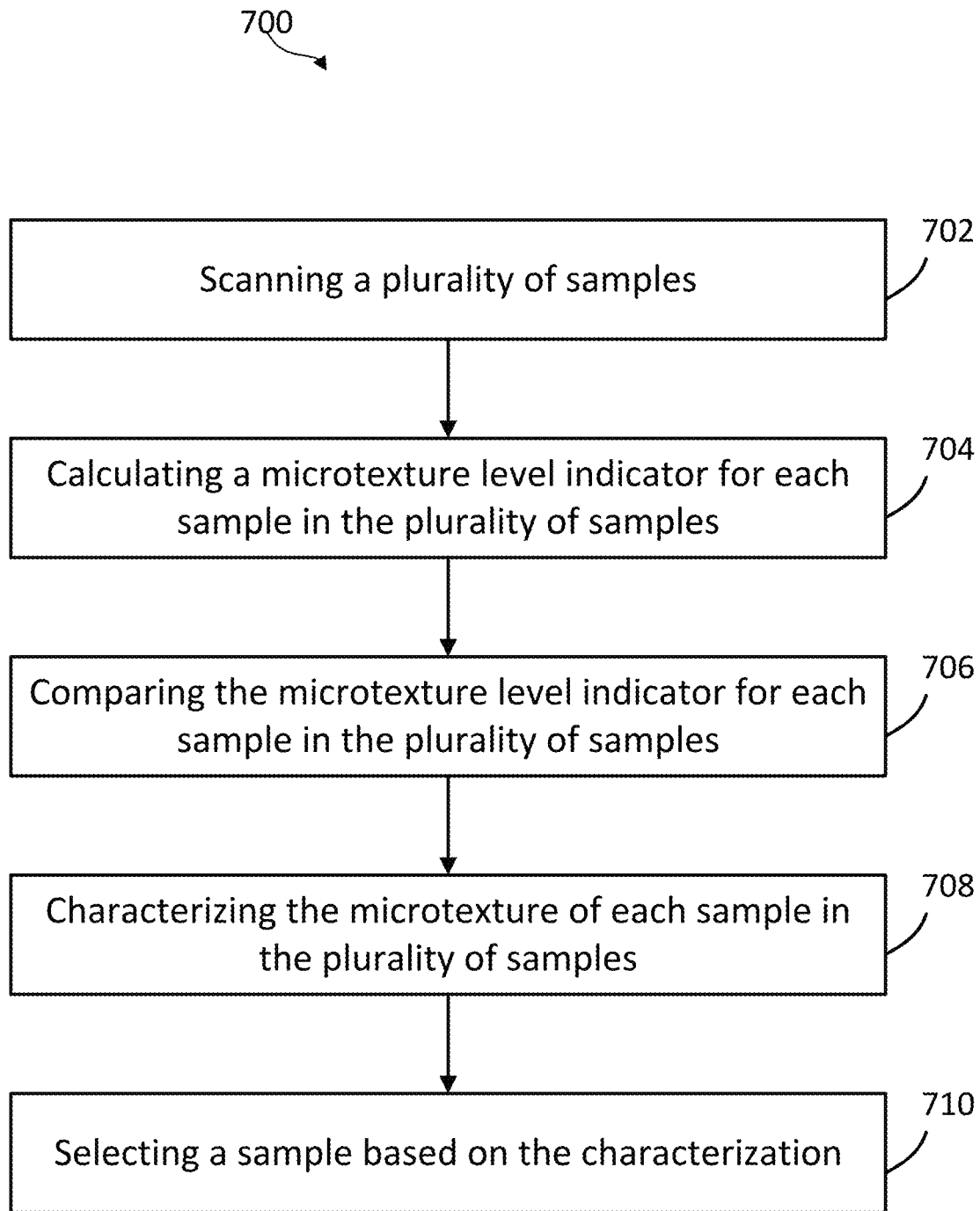
FIG. 7 illustrates a method of characterizing various treatments for a component.

Referring now to FIG. 7, a method 700 of determining a treatment method is illustrated in accordance with various embodiments. The method comprises scanning a plurality of samples (step 702). Each sample in the plurality of samples may comprise a different treatment method for a component, such as heat treatment, or the like. The scanning may be performed in accordance with the system 100 from FIG. 1. The scanning may be performed by an ultrasonic transducer, or the like. The method 700 may further comprise calculating a microtexture level indicator for each sample in the plurality of samples (step 704). The microtexture level indicator may comprise at least one of an average peak factor, a standard deviation of peak amplitudes, and/or a baseband bandwidth.

The method 700 may further comprise comparing the microtexture level indicator for each sample in the plurality of samples (step 706). In this regard, the microtexture level indicator may be plotted providing a visual indication of the microtexture level indicator as a function of sample. The method 700 may further comprise characterizing the microtexture of each sample in the plurality of samples (step 708). In this regard, a sample in the plurality of samples that includes the lowest microtexture level indicator in the plurality of samples may be characterized as a treatment method resulting in the greatest potential service life of the sample. Each treatment method in the plurality of treatment methods may be ranked based on the characterization of the microtexture of each sample. By characterizing treatment methods of a component in this manner, a treatment method may be selected for a component in response to the characterization of the microtexture level of a respective sample (step 710).

Figure 8:
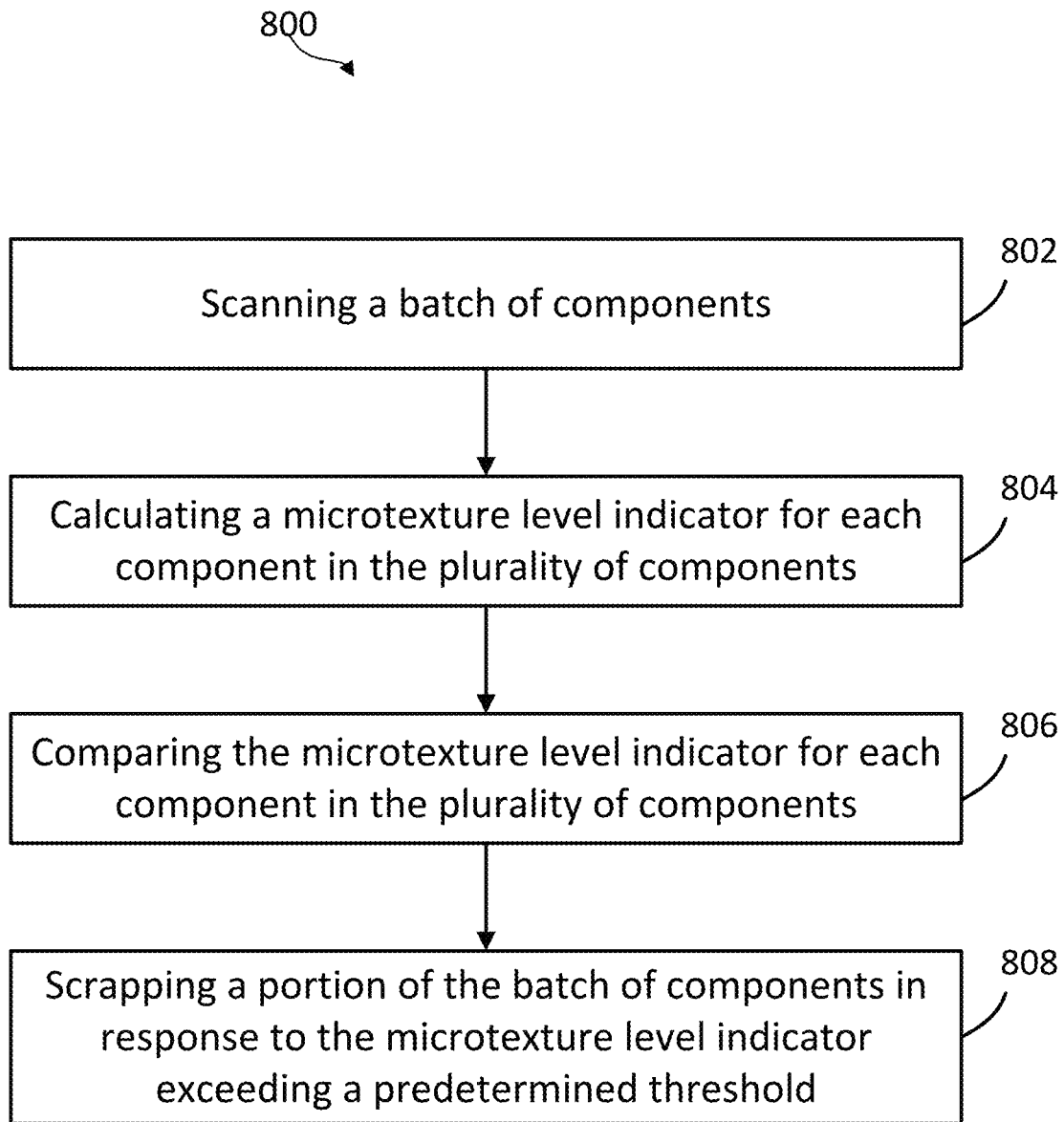
FIG. 8 illustrates a method of selecting components for use in production, in accordance with various embodiments.

Referring now to FIG. 8, a method 800 of determining selecting components for use in production is illustrated, in accordance with various embodiments. The method comprises scanning a batch of components (step 802). The scanning may be performed in accordance with the system 100 from FIG. 1. The component may comprise a rotor 500, or any other gas-turbine engine component. The scanning may be performed by an ultrasonic transducer, or the like. The method 800 may further comprise calculating a microtexture level indicator for each component in the batch of components (step 804). In various embodiments, a life limiting region from method 600 may be analyzed for each component in the batch of components. The microtexture level indicator may comprise at least one of an average peak factor, a standard deviation of peak amplitudes, and/or a baseband bandwidth.

The method 800 may further comprise comparing the microtexture level indicator for each component in the batch of components (step 806). In this regard, the microtexture level indicator may be plotted providing a visual indication of the microtexture level indicator as a function of the batch of components. The method 800 may further comprise scrapping a portion of the components in the batch of components in response to the microtexture level indicator of the portion of the components exceeding a predetermined threshold (step 808). In this regard, the components that are not scrapped may include a microtexture level indicator that is below the predetermined threshold. This may allow the selected components to provide enhanced service life compared to the scrapped components. By determining components for use in service in this manner, a service life of a fleet of components may be maximized.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   scanning a plurality of regions of a component with an ultrasonic transducer;
   calculating a peak factor for each region in the plurality of regions, the peak factor configured to compare a local peak amplitude to a mean amplitude; and
   determining a limiting region in the plurality of regions, the limiting region corresponding to a maximum peak factor.

2. The method of claim 1, wherein the peak factor comprises at least one of an average peak factor, a standard deviation of peak amplitudes, and a baseband bandwidth.

3. The method of claim 1, wherein the scanning is performed in a tank filled with a fluid, and wherein the component is disposed in the tank.

4. The method of claim 1, wherein the peak factor of each region in the plurality of regions corresponds to an average peak factor over a range of peaks from the scanning.

5. The method of claim 1, further comprising comparing the peak factor of the plurality of regions.

6. The method of claim 1, wherein the limiting region is a service life limiting region of the component.

7. A method, comprising:
   scanning a plurality of samples with an ultrasonic transducer, each sample in the plurality of samples being different;
   calculating a peak factor for each sample in the plurality of samples, the peak factor configured to compare a local peak amplitude to mean amplitude; and
   determining a microtexture level of each sample in the plurality of samples based on the peak factor.

8. The method of claim 7, wherein each sample in the plurality of samples corresponds to a different heat treatment of an alloy.

9. The method of claim 7, further comprising selecting a heat treatment for an alloy corresponding to a lowest microtexture level in the plurality of samples.

10. The method of claim 7, wherein the peak factor comprises at least one of an average peak factor, a standard deviation of peak amplitudes, and a baseband bandwidth.

11. The method of claim 7, further comprising comparing the peak factor for each sample in the plurality of samples.

12. The method of claim 7, wherein the scanning is performed in a tank filled with a fluid, and wherein the sample is disposed in the tank.

13. A method, comprising:
    scanning a batch of components with an ultrasonic transducer;
    calculating a peak factor for each component in the batch of components, the peak factor configured to compare a local peak amplitude to mean amplitude; and
    scrapping a portion of the batch of components in response to the peak factor of each component in the portion of the batch of components exceeding a peak factor threshold.

14. The method of claim 13, further comprising scanning a plurality of regions of a component in the batch of components with the ultrasonic transducer prior to scanning a remaining portion of the batch of components; and characterizing a limiting region in the plurality of regions, the limiting region corresponding to a maximum peak factor.

15. The method of claim 14, wherein the peak factor for each component is determined from the limiting region in the plurality of regions.

16. The method of claim 13, wherein the peak factor comprises at least one of an average peak factor, a standard deviation of peak amplitudes, and a baseband bandwidth.

17. The method of claim 13, further comprising comparing the microtexture level indicator for each component in the batch of components.

18. The method of claim 13, wherein the scanning is performed in a tank filled with a fluid, and wherein the component is disposed in the tank.

* * * * *